Mar. 6, 1923.

W. H. SNYDER ET AL.
SHUTTER CONTROLLING MECHANISM.
FILED NOV. 15, 1920.

1,447,906.

Inventor
Ward H. Snyder.
Frank F. Farkas.
By Cheever & Cox Attys.

Patented Mar. 6, 1923.

1,447,906

UNITED STATES PATENT OFFICE.

WARD H. SNYDER AND FRANK F. FARKAS, OF CHICAGO, ILLINOIS.

SHUTTER-CONTROLLING MECHANISM.

Application filed November 15, 1920. Serial No. 424,080.

*To all whom it may concern:*

Be it known that we, WARD H. SNYDER and FRANK F. FARKAS, citizens of the United States, residing at Chicago, in the county of Cook and State of Illinois, have invented a certain new and useful Improvement in Shutter-Controlling Mechanisms, of which the following is a specification.

Our invention relates to photographic cameras and more particularly to the shutter controlling mechanism thereof. The object of the invention is to eliminate the uncertainties of photography, especially as to the amount of light which may properly be admitted to the sensitized film or plate to obtain the best results under the particular conditions of each individual case. Differently stated, it is our purpose to enable a comparatively unskilled operator to determine beforehand what speed of shutter and size of diaphragm opening are desirable for the conditions under which the picture is to be taken. The amount of light which will reach the sensitized film depends, of course, upon two factors: first, the extent to which the diaphragm opens, and, second, the amount of time during which the shutter is open. Other things being equal, a sharper image is obtained by using a smaller opening and giving a longer exposure. A small opening is practicable in photographing "still life" subjects but not in photographing rapidly moving objects— hence ordinarily the operator has to use his discretion both as to speed of shutter and size of diaphragm opening. Our object is to enable him to do this with certainty. In the form shown, our invention is applied to a camera in which the light is admitted to the film thru a diaphragm and an automatic shutter. The diaphragm is of the iris type and can be adjusted (while the shutter is closed) to a larger or smaller size of aperture. The shutter can then be adjusted for speed.

In carrying out our invention we have provided a finder glass or ground glass on which an image of the subject will be projected. We also provide a supplemental iris diaphragm in position to control the amount of light which will reach said glass, and by judging the degree of illumination on the glass the operator will be able to determine whether this supplemental or test diaphragm is open to the proper degree. In our device the leaves of the test diaphragm are under the joint control of two rotatable elements each provided with a controlling arm. One of these arms is mechanically connected to the speed regulator of the shutter of the camera and the other is mechanically connected to the diaphragm of the camera. Thus the quantity of light reaching the finder glass is under the joint control of two elements and the quantity of light reaching the film is under the joint control of two elements, and the two elements associated with the finder glass are individually connected to and operate the two elements associated with the lens and hence the operator is assured that if the finder glass is properly illuminated the film will be. And this will be true for any combination of opening and speed.

We accomplish our object by the mechanism illustrated in the accompanying drawings in which:—

Like numerals denote like parts thruout the several views.

Figure 1:
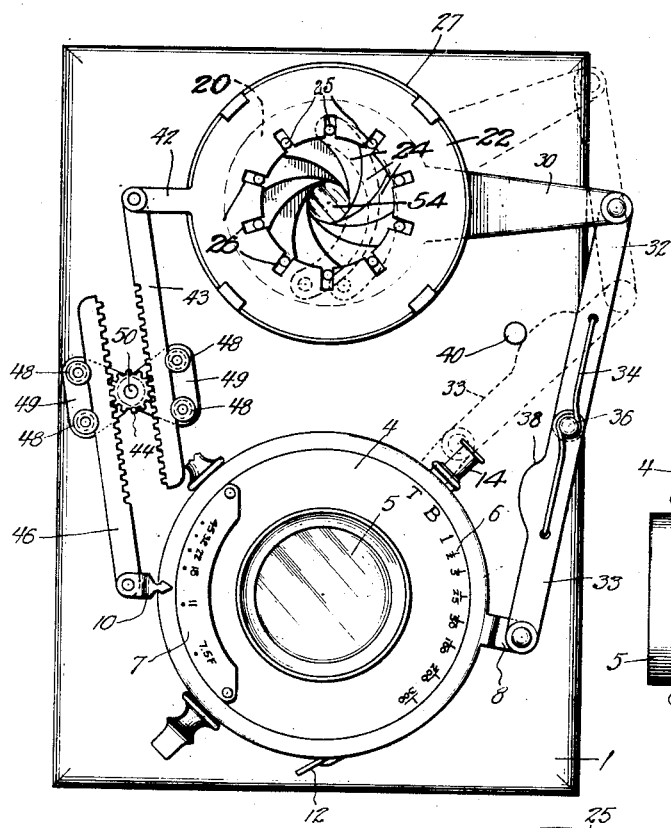
Figure 1 is a front elevation of the camera equipped with the invention.
Figure 2:
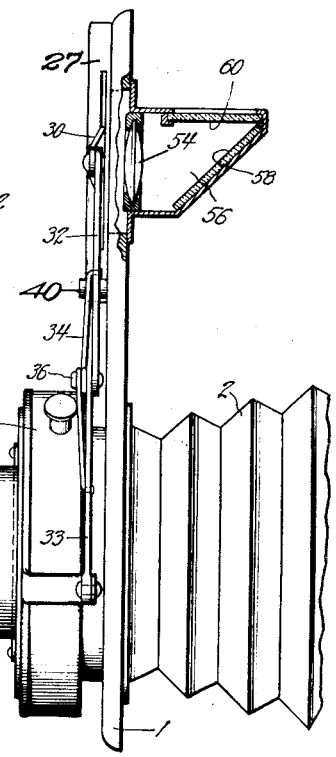
Figure 2 is a side elevation of the parts shown in Figure 1, the finder glass and associated parts being in section.

In the form selected to illustrate the invention the camera has a front plate 1 to which the forward end of the bellows 2 is connected in the usual manner. Mounted on the front of the plate is a so-called automatic shutter 4. These devices are well known in themselves, the general type being shown, for example, in Wollensak Patent 961,192 issued June 14, 1910. The device has a shutter and a diaphragm, one behind the other, which jointly control the amount of light reaching the sensitized plate or film. The device is provided with a lens 5 as usual and it is also provided with two scales 6 and 7. Scale 6 shows the time or "speed" to which the shutter is adjusted, and the scale 7 indicates the size of opening to which the diaphragm is adjusted. It will be sufficient for the present purpose to say that the speed is regulated by a rotatable element 8 and the size of the opening is regulated by a rotatable element 10 which cooperate respectively with the scales 6 and 7. According to the arrangement illustrated, the speed increases as element 8 moves downward in Figure 1 and the size of the opening increases as the element 10 moves downward in Figure 1. As usual with automatic shutters of this type a lever 12 is provided for setting the shutter and a push button 14 is provided for releasing it. From the foregoing it will be evident that as the element 8 descends the effect will be to reduce the quantity of light admitted to the sensitized film and that as the element 10 descends the effect will be to admit a larger quantity of light.

Figure 3:
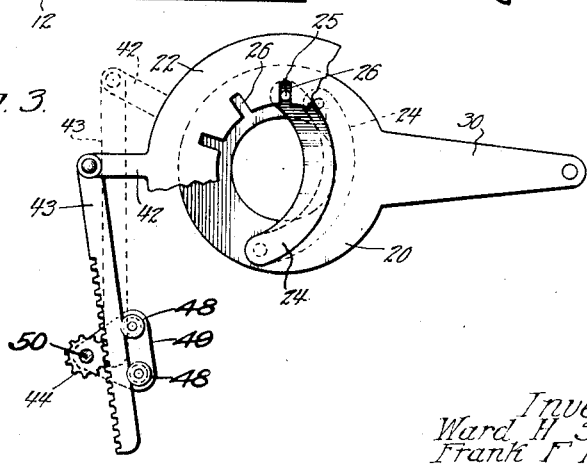
Figure 3 is a fragmentary detail illustrating the construction and principle of operation of the test diaphragm.

At a convenient portion of the front plate we provide a test diaphragm of the iris type. This consists in the main of two concentric rings 20, 22. Pivoted to ring 20 are leaves 24, the free end of each leaf having a pin 25 adapted to work within a slot 26 in the companion ring 22. The rings are rotatably mounted in a frame 27. When ring 22 stands still and ring 20 is rotated in a clockwise direction, Figures 1 and 3, the central opening surrounded by the leaves will become smaller and when ring 22 is rotated in counter-clockwise direction the opening will become larger. If the ring 20 is held still and the ring 22 is rotated in a clockwise direction the opening between the leaves will become larger and if the ring is rotated in a counter-clockwise direction the opening will become smaller. In this respect, the parts 20, 22, 24 constitute what is known in the art as an "iris diaphragm." It constitutes what may be termed the "test diaphragm" of our apparatus. Ring 20 has an arm 30 connected at the outer end to a link 32. The other end of the link is pivotally connected to a second link 33 which in turn is pivotally connected to the arm 8 of the speed adjuster. A spring 34 is attached to the two links 32 and 33, and encircles a pin 36 at the connected ends of said links, the result being that the links tend to come into line with each other. Link 33 has a cam surface or edge 38 adapted to contact a stationary pin 40 to break the links as shown in dotted lines, Figure 1, when the speed adjuster 8 is in the upper portion of its arc of travel. This arrangement makes the mechanism operate more smoothly and easily at the higher points but also performs the very important function of permitting arm 8 to travel past the "one second" portion of scale 6 to "bulb" and "time" marked respectively "B" and "T" on the scale without altering the position of the arm 30 to any appreciable extent, that is, it enables the speed adjuster to go to "bulb" and "time" without moving the test shutter. This action results from the fact that after the speed adjuster arm 8 passes point "1" on the scale, the two arms 8 and 30 and the links 32 and 33 will occupy such relation that during this final arc, the movement of link 32 will practically be centered about its point of attachment to arm 30.

The ring 22 has an arm 42 which is pivotally connected to the upper end of a rack 43 which meshes with a pinion 44. The opposite side of the pinion meshes with a similar rack 46 which is pivotally connected at the lower end to the arm 10 which regulates the size of the opening of the diaphragm. The racks 43 and 46 are kept in mesh with the pinion by guide rollers 48 mounted in frames 49 which are pivoted on the pin 50 by which pinion 44 is supported. By inspecting Figure 1 it will be seen that when arm 10 is raised it will lower arm 42. Hence, if the operator grasps the opening adjuster 10 and moves it downward it will rotate ring 22 in a direction to admit more light thru the automatic test diaphragm and also admit more light thru the shutter. Also, if the operator grasps the speed adjuster 8 and moves it downward it will rotate ring 20 in a direction to admit less light thru the test diaphragm, and also admit less light thru the automatic shutter (because the time during which the latter will be open will be decreased). Behind the opening of the test diaphragm is a lens 54 mounted in an opening in the front plate 1. This admits light to a chamber 56 which is provided with a mirror 58 so located as to reflect the light rays upward against the horizontal finder glass 60. This is preferably a piece of "ground" glass and affords the user means for judging the degree of lighting to which it is subjected. It is obvious that the amount of light which will reach the finder glass will depend on the size of the opening to which the test diaphragm is adjusted. It will also be clear that the operator by manipulating either the speed adjusting arm 8 or the size adjusting arm 10 can vary the amount of light reaching the finder glass and will simultaneously and automatically vary the position and speed of operation of the elements which determine the amount of light which will reach the sensitized film.

In operation, the user positions the camera, usually by aid of the finder glass. In any event, when the camera is properly positioned, the degree of illumination on the finder glass will depend upon the size of the opening to which the test diaphragm is adjusted. If, in viewing the glass, the operator considers that it is insufficiently illuminated, he increases the illumination by manipulating either one or both of the adjusting elements 8, 10. If a picture is to be taken of a stationary or slow moving object the operator will move the opening regulator 10 to a point where the opening in the diaphragm of the automatic shutter will be small, and he will make up for the deficiency of illumination by moving the speed regulator to a point where the exposure will be long. If the object to be photographed is moving rapidly the operator will move the opening adjuster 10 to a position to produce a large opening in the diaphragm of the automatic shutter and make up for the excess of illumination by moving the speed regulator to a point where the exposure will be short. No special skill will be required for the parts are correlated in such manner that if the illumination on the finder glass 60 is proper the user will be assured that the quantity of light reaching the sensitized film will be the proper amount. Thus the user is insured against under exposure or over exposure for he is able at his leisure to observe the degree of illumination upon the finder glass. After the adjusters 8, 10 have been manipulated so as to produce the desired degree of illumination the operator is ready to make exposure on the film, which he accomplishes by first actuating the setting lever 12 and then pressing the button 14.

As previously stated, the design and arrangement of the parts 8, 30, 32, 33, 40 are such that after the time adjuster 8 has reached the point on scale 6 where the automatic shutter will remain open for one second, it may be moved forward to "bulb" or "time", indicated by B and T respectively, without changing the adjustment of the test diaphragm. Hence, if the operator wants to control the exposure by hand he can do so without altering the adjustment of the test diaphragm. It will be noted, however, that this does not render it impossible for the size of opening of the test diaphragm to be altered, for such alteration may be effected by adjusting the opening adjuster 10. Thus the operator may increase or decrease the amount of light which will reach the sensitized film whether the exposure is automatically timed by the shutter or is determined by manual control.

It will be understood that the arrangement of the parts may be considerably varied without departing from the spirit of the invention, for example, the relative positions of the parts on the front plate may be varied in position or form so long as the principle of operation remains the same. Furthermore, the operating parts may be enclosed within any suitable housing for protecting them against contact with external objects.

Having thus described our invention, what we claim as new and desire to obtain by Letters Patent is:

1. In a camera, an exposure determining device including a test diaphragm of the iris type having leaves, a main camera lens, a shutter for said lens, a main diaphragm for said lens, and two controlling elements, one for controlling the size of the main diaphragm opening and the other for controlling the speed of the shutter, the leaves of the test diaphragm being subject to the joint control of said controlling elements.

2. In a camera, an exposure determining device including a ground glass, a test diaphragm of the iris type for controlling the amount of light falling on said ground glass, a main camera lens, a shutter for said lens, a main diaphragm for said lens, two controlling elements, one for controlling the size of the main diaphragm opening and the other for controlling the speed of the shutter, the test diaphragm being of the iris type and having leaves and two independently rotatable rings, the leaves being pivoted at one end to one of the rings and at the opposite end connected to the other ring whereby the size of the opening is under the joint control of said rings, said rings being connected to said controlling elements for being rotated by them.

3. A photographic camera having a ground glass, two controlling elements, a test diaphragm of the iris type subject to the joint control of said controlling elements for determining the amount of light projected onto said ground glass, a main camera lens and means also subject to the joint control of said two controlling elements for determining the amount of light projected onto said lens.

4. A photographic camera having a shutter adjustable for speed, a diaphragm adjustable for opening, a ground glass, a test diaphragm of the iris type adapted to control the amount of light projected onto the ground glass, and two manually operated controls, the test diaphragm being subject to the joint action of said controls and one of said controls being adapted to adjust the main camera shutter and the other being adapted to adjust the main camera diaphragm.

5. A photographic camera having a main camera shutter adjustable for speed, a main diaphragm adjustable for size of opening, a ground glass and a test diaphragm adapted to control the amount of light projected onto the ground glass, said test diaphragm being of the iris type and having leaves and two independent manually operated controls, the leaves of the test diaphragm being subject to the joint action of said controls and, one of said controls being adapted to regulate the speed of the main camera shutter and the other being adapted to regulate the size of opening of the main camera diaphragm.

6. A camera having a finder, a diaphragm of the iris type for regulating the amount of light projected onto the finder, said diaphragm having leaves and two independently rotatable rings, the leaves being pivoted at one end to one of the rings and at the opposite end connected to the other ring whereby the size of the opening is under the joint control of said rings, a main lens exposure timing mechanism for the main lens, illumination controlling mechanism for the main lens, and means automatically operated by adjustment of said rings for adjusting the exposure timing mechanism and the illumination controlling mechanism.

In witness whereof, we have hereunto subscribed our names.

WARD H. SNYDER.
FRANK F. FARKAS.